United States Patent Office
3,298,967
Patented Jan. 17, 1967

3,298,967
PROCESS FOR PREPARING HIGH MOLECULAR WEIGHT PHOSPHONATE POLYMERS
John H. Mason, Grand Island, N.Y., assignor to Union Carbide Corporation, a corporation of New York
No Drawing. Filed Apr. 4, 1963, Ser. No. 270,521
4 Claims. (Cl. 260—2)

The present invention relates to high molecular weight phosphonate polymers. More particularly this invention relates to high molecular weight linear, phosphonate polymers produced by the catalyzed polymerization of cyclic phosphonates.

In the past many attempts to produce phosphonate polymers of high molecular weight have been made. The first reported attempt was through the condensation reaction of aromatic diols with phosphorous oxychloride, phosphorous trichloride, and thiophosphoryl chloride. Later attempts were directed to the ester interchange reaction between a phosphonate ester and a diol. These attempts however have all failed to produce phosphonate polymers of high molecular weight.

Molecular weights of these polymers are determined through the expedient of reduced viscosities. It has been generally recognized by the art that in order to be useful for general molding applications a polymer must exhibit a reduced viscosity of at least 0.35 as determined on a 0.2 gram sample of polymer in 100 ml. of a suitable solvent, which for phosphonate polymers of this invention is chloroform. While polymers having reduced viscosities less than 0.35 do find utility as additives to polymer compositions, coatings, adhesives, and the like, their use is limited and they are not suitable as molding resins.

In accordance with the present invention, it has now been discovered that phosphonate polymers, having a reduced viscosity greater than 0.35, are prepared through the polymerization of cyclic phosphonate monomers with specific metalloorganic catalysts, i.e., namely di(lower alkyl) zinc or cadmium compounds or polyisobutylaluminum oxide.

In addition it has also been discovered that a novel class of phosphonate copolymer can be prepared from cyclic phosphonate monomers as hereinafter set forth in detail.

The polymers of the present invention contain the polymerized unit

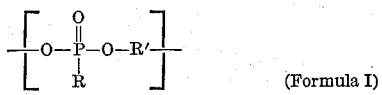

(Formula I)

wherein R is a monovalent hydrocarbon radical containing from 1 to about 18 carbon atoms, inclusive, and R' is an alkylene radical containing from about 2 to about 18 carbon atoms inclusive in which the valency or bonding carbon atoms are separated by no more than one carbon atom, which unit is the residue of a 5 or 6 member cyclic phosphonate monomer of the formula

(Formula II)

Included within the term "monovalent hydrocarbon radical" as represented by R are alkyl radicals such as methyl, ethyl, propyl, butyl, pentyl, hexyl, octyl, decyl, dodecyl, heptadecyl and the like; aryl radicals such as phenyl, tolyl, ethylphenyl, mesityl, and the like; and aralkyl radicals such as benzyl, phenethyl and the like.

It should be noted that the monovalent hydrocarbon radicals as represented by R serve merely as appendages which can or may affect the polymer properties but do not enter into the polymerization reaction. For this reason, and because they are more easily prepared, it is preferred that radicals represented by R contain 1 to 8 carbon atoms inclusive. Also for this reason said monovalent hydrocarbon radicals may contain any substituents inert to the polymerization reaction, i.e. which do not enter into the polymerization reaction or react with the catalyst to inhibit polymerization. Illustrative of such non-reactive groups are halogens such as fluoro, chloro, bromo, and iodo; alkoxy groups such as methoxy, ethoxy, propoxy, butoxy and the like; aroxy such as phenoxy and the like; and lower alkyls such as methyl, ethyl, propyl and the like.

Included within the term alkylene radical containing from two to eighteen carbon atoms inclusive as represented by R' are 1,2-ethylene, 1,2-propylene, 1,3-propylene, 1,2-butylene, 1,3-butylene, 2,3-butylene, 1,2-pentylene, 1,3-pentylene, 2,4-pentylene, 1,2-hexylene, 1,3-hexylene, 2,4-hexylene, 3,4-hexylene, 2,3-dimethylbutylene-2,3 and the like. These radicals can also contain inert substituents as defined and illustrated above.

These phosphonate polymers can be either homopolymers or copolymers. The phosphonate copolymers contain from about 0.1 percent to about 99.9 percent phosphonate units based upon the total polymer. Copolymers may be prepared from any of the polymerizable cyclic monomers.

Illustrative of said copolymerizable monomers are: cyclic phosphonates, cyclic carbonates, lactones, epoxides, lactams, oxalactones, thialactones, thiaoxylactones, azalactones, cyclic esters of dibasic acids and diols, cyclic anhydrides, cyclic formals, cyclic acetals and cyclic ketals, cyclic thiocarbonates, cyclic sulfates, sultones, N-substituted cyclic amides and the like. Copolymers of cyclic phosphonates and different cyclic phosphonates, cyclic carbonates, lactones, and epoxides are preferred as these copolymers exhibit excellent, although differing physical properties.

While both the homopolymers and copolymers described above are thermoplastic in nature it has been found that these polymers can be cross linked. Crosslinking can be effected by the inclusion of small amounts of cyclic phosphonate monomers wherein R is or contains a polymerizable substituent such as vinyl group. Crosslinking can also be effected by radiation and by other known physical crosslinking means.

The monomers which are polymerized to form the polymers of this invention are the 5 or 6 membered cyclic phosphonates of the formula:

(Formula II)

wherein R and R' have been previously defined.

These monomers can be prepared by methods well known to the art. One such method is by the condensation of a 1,2-diol or a 1,3-diol with an oxyphosphorous dichloride as taught by Toy in U.S. 2,382,622, issued August 14, 1945. This reaction can be represented as follows:

(Reaction 1)

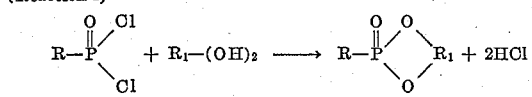

wherein R and R₁ have been previously defined. These monomers and their various methods of preparation are known to the art.

The monomers which will copolymerize with the cyclic phosphonates are discussed above under polymers.

( POLYMERIZATION

The phosphonate polymers are prepared in bulk by charging a reaction vessel with the desired monomer or mixture of monomers, adding a polymerization catalyst, and heating the monomer to a temperature at which polymerization will ensue.

Catalysts which will effect polymerization include: the metals and metal hydrides of the group Ia, IIa, IIb, IIIa and IIIb metals (all references to the Periodic Classification of Elements as they appear in the Merck Index, 7th edition, inside cover, 1960, Merck and Co., Inc.), such as lithium, sodium, potassium, rubidium, beryllium, magnesium, calcium, strontium, barium, boron, aluminum, gallium, indium, tantalum, zinc, cadmium, mercury, scandium, and the like, their respective metal hydrides, and hydrides of their alloys such as lithium aluminum hydride, sodium borohydride and the like.

Organometallic compounds of the group Ia metals such as those having the formula $R^2M$ and $R^3M_x$ wherein $R^2$ is a monovalent organic radical and $R^3$ is a polyvalent organic radical having the valence $x$ and M is a group Ia metal. Compounds of this type include phenyl lithium, n-butyl lithium, amyl sodium and the like.

Organometallic compounds of Group IIa or Group IIb except mercury metals include those compounds having the formula:

$$(R^2)_2M \text{ and } R^2M^1A$$

wherein $R^2$ has been previously defined, $M^1$ is a group IIa or IIb metal and A is a negative substituent such as hydrogen, halogen, hydroxy, alkoxy, cyano, and the like. Included within this category are n-butyl magnesium bromide, di-n-butyl magnesium, di-n-butyl zinc, dimethyl cadmium and the like.

Organometallic compounds of Group IIIa and Group IIIb having the formula $R_3^2M^2$, $R_2^2M^2A R^2M^2A_2$ wherein $R^2$ and A have been previously defined and $M^2$ is a Group IIIa or IIIb metal, and the partial hydrolysis products thereof. Included within this category are triisobutyl aluminum and its partial hydrolysis product poly(isobutylaluminum oxide).

This latter compound is prepared by reacting triisobutyl aluminum and water in a mole ratio of from 0.97 to 1 to 1.05 to 1.0 triisobutyl aluminum to water respectively. The partially hydrolyzed product contains the following repeating units:

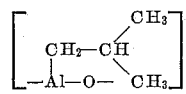

Metal alkoxides of the metals of Groups I, II or III having the formula:

$$(RO)_bM^{2b}$$

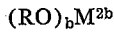

wherein R has been previously defined, $M^3$ is a metal of group I, II or III and $b$ is an integer equal to the valence of $M^3$. Included within this category are potassium-t-butoxide, zinc dibutoxide, aluminum isopropoxide and the like.

Metal amides—potassium amide, lithium amide, sodamide, calcium amide, and the like.

And metal halides of Group IIIa metals such as the Friedel-Crafts catalysts. Included within this category are aluminum chloride, boron trifluoride and the like.

Preferred catalysts for the polymerization of the cyclic phosphonates are di-n-butyl zinc, dimethyl cadmium and poly(isobutylaluminum oxide) as these catalysts produce high yields of polymers having high reduced viscosities above 0.35.

The polymerization catalysts are generally used in a catalytic amount. This amount has been found to be from 1.0 to 7.0 millimoles per mole of monomer reacted. While greater or lesser amounts of catalyst can be used, smaller amounts of catalyst appear to produce polymers of higher reduced viscosity until the amount becomes small enough that catalyst impurity concentration becomes relatively large and interferes with the polymerization.

The polymerization of the cyclic phosphonates is conducted at temperatures of from 80° to 175° C. and preferably from 90° to 120° C.

In conducting the polymerization reactions diluents may be used. Suitable diluents include benzene, toluene, xylene, cyclohexane and the like.

While for obvious reasons these reactions are normally conducted at atmospheric pressure, subatmospheric pressures or superatmospheric pressures can also be used.

*Tests.*—In the examples which follow the following test procedures were used:

Tensile strength _____ A.S.T.M. D-412-61T
1% secant modulus _____ A.S.T.M. D-412-61T
Percent elongation _____ A.S.T.M. D-412-61T All references hereinafter to parts, unless otherwise specified, refers to parts by weight.

*Example I.—Polymerization of ethylene phenylphosphonate with di-n-butylzinc*

To a 500 milliliter reaction vessel fitted with a mechanical stirrer was charged 15.0 grams of ethylene phenylphosphonate. The vessel was then purged with nitrogen gas and a nitrogen atmosphere was thereafter maintained in the vessel. Stirring was initiated and the vessel was heated until the phosphonate therein had attained a temperature of 87° C. A solution consisting of 0.09 gram of di-n-butylzinc in one milliliter of toluene was then added to the ethylene phenylphosphonate. This addition resulted in an immediate exothermic reaction which caused the temperature of the reaction mixture to rise 17° C. in a period of three minutes. This reaction was also marked by an increase in viscosity of the reaction mixture and the cessation of stirring. Although the reaction was apparently complete after a period of from three to five minutes, the temperature of the reaction mixture was maintained between 80° C. and 90° C. for a period of eighteen hours to insure maximum conversion to polymer. The reacted mixture was removed from the reaction vessel and purified by dissolution in methanol followed by precipitation in water. A total of 11.4 grams of ethylene phenylphosphonate polymer was recovered, said polymer having a reduced viscosity of 0.42 measured in chloroform at a temperature of 25° C. and a concentration of 0.2 gram polymer per 100 milliliters of chloroform.

*Example II.—Polymerization of trimethylene phenylphosphonate with di-n-butylzinc*

Utilizing the method described in Example I above, 22.2 grams of trimethylene phenylphosphonate was polymerized using 0.09 gram of di-n-butylzinc in one milliliter of toluene as the catalyst. No exothermic reaction or increased viscosity was observed within five minutes after adding the catalyst. However, after maintaining the reaction mixture at a temperature of 90° C. for a period of eighteen hours the reacted mixture was extremely viscous. Purification of the reacted mixture by the method described in Example I, gave a 72 percent yield of polymer exhibiting a reduced viscosity in chloroform of 0.50 measured at a temperature of 25° C. and a concentration of 0.2 gram of polymer per 100 milliliters of chloroform.

*Example III.—Polymerization of ethylene phenylphosphonate with dimethyl cadmium*

Utilizing the method described in Example I, above, 13.8 grams of ethylene phenylphosphonate was polymerized using 0.21 gram of dimethyl cadmium in 0.5 milliliter of toluene as the catalyst. As in Example I there was an immediate exothermic reaction, raising the temperature of the reaction mixture 19° C. in a period of three minutes. There was also an immediate corresponding increase in viscosity. Again, although the reaction was apparently complete after five minutes, the temperature of the reaction mixture was maintained in the range of from 90° C. to 100° C. for a period of six hours to insure maximum conversion to polymer. Purification of the reacted mixture as described in Example I gave a 53 percent yield of polymer exhibiting a reduced viscosity in chloroform of 0.36 measured at a temperature of 25° C. and a concentration of 0.2 gram of polymer per 100 milliliters of chloroform.

*Example IV.*—*Polymerization of ethylene phenylphosphonate with the partial hydrolysis product of triisobutyl aluminum poly(isobutylaluminum oxide)*

Partially hydrolyzed triisobutylaluminum was prepared by reacting 1.98 grams of triisobutylaluminum in 10 milliliters of heptane with 0.16 gram of distilled water. Utilizing the method described in Example I, above, 15.0 grams of ethylene phenylphosphonate was polymerized, using 0.5 milliliter of the freshly prepared, hydrolyzed triisobutylaluminum solution described above. Although a thick, gel-like foam forms on the top of the ethylene phenylphosphonate when the catalyst is added, there is no apparent exothermic reaction or general thickening of the reaction mixture. Maintenance of the temperature of the reaction at 10° C. to 110° C. for a period of nineteen hours, however, gives a very viscous reaction mixture. Purification of the reacted mixture as described in Example I produced an 81 percent yield of polymer having a reduced viscosity in chloroform of 0.67 measured at a temperature of 25° C. and a concentration of 0.2 gram of polymer in 100 milliliters of chloroform.

*Examples 5–29.*—*Comparison of effectiveness of various catalysts for the bulk polymerization of ethylene phenylphosphonate*

Utilizing the method of Example I, above, ethylene phenylphosphonate was polymerized using various catalysts. The polymer was purified by the same method as described in Example I and the reduced viscosity in chloroform was determined at a temperature of 25° C. and a concentration of 0.2 gram of polymer per 100 milliliters of chloroform. The catalyst, catalyst concentration, reaction temperatures, yield, description, and reduced viscosity of the polymer is recited for each example in Table I below and through which the efficiency of various catalysts can be compared. The reaction periods for each of the polymerizations was between 16 and 20 hours.

It can be seen from the data below that only those polymers of Examples 5, 6 and 7 have sufficiently high molecular weight so as to exhibit a reduced viscosity above 0.35 and the other catalysts produced only low molecular weight polymers.

TABLE I

| Example No. | Catalyst Used | Catalyst Concentration in millimoles per mole of monomer | Reaction Temperature in ° C. | Polymer Yield in percent | Reduced viscosity |
|---|---|---|---|---|---|
| 5 | Di-n-butylzinc | 6.4 | 87 | 76 | 0.42 |
| 6 | Dimethyl cadmium | 20.0 | 83 | 53 | 0.36 |
| 7 | Polyisobutylaluminum oxide | 6.1 | 106 | 81 | 0.67 |
| 8 | Sodium Hydride | 33.2 | 125 | 46.3 | 0.05 |
| 9 | Sodium Hydride and Dichlorophenyl phosphine oxide. | 35.8 / 15.0 | 125 | 36.1 | 0.06 |
| 10 | Dichlorophenyl phosphine oxide | 44.4 | 125 | | |
| 11 | Phenyl lithium | 23.2 | 90 | 41.4 | 0.06 |
| 12 | n-Butyl lithium | 10.9 | 93 | 64.5 | 0.22 |
| 13 | Amyl sodium | 17.0 | 92 | 37.0 | 0.12 |
| 14 | Potassium t-butoxide | 5.7 | 100 | 0 | |
| 15 | n-Butylmagnesium bromide | 20.8 | 114 | 76.0 | 0.04 |
| 16 | Di-n-butyl magnesium | 8.8 | 98 | 69.7 | 0.05 |
| 17 | Modified calcium amide #1 [1] | (Ca.) 24.2 | 110 | 85.3 | 0.18 |
| 18 | Doubly modified calcium amide #2 [1] | (Ca.) 23.2 | 108 | 80.5 | 0.10 |
| 19 | Zinc dibutoxide | 6.2 | 94 | 81 | 0.10 |
| 20 | Dimethyl mercury | 4.5 | 100 | | |
| 21 | Triisobutyl aluminum | 7.0 | 94 | 88 | 0.19 |
| 22 | Aluminum isopropoxide | 7.9 | 86 | 34 | 0.07 |
| 23 | Aluminum chloride | 2.5 | 100 | 1.6 | (²) |
| 24 | Aluminum chloride and Isobutyl chloride. | 5.1 / 3.0 | 100 | 2.4 | (²) |
| 25 | Aluminum chloride and n-Butyl bromide. | 3.3 / 3.9 | 100 | 1.2 | (²) |
| 26 | Boron trifluoride etherate | 99 | 90 | 47.8 | 0.06 |

[1] As described in U.S. 2,969,402.
[2] Insoluble.

*Examples 30–38.*—*Di-n-butylzinc catalyzed polymerizations of various cyclic phosphonate monomers*

Utilizing the method described in Example 1, above, various cyclic phosphonate monomers were polymerized utilizing di-n-butylzinc as the catalyst. The polymer was purified by the same method as described in Example I and the reduced viscosity in chloroform was determined at a temperature of 25° C. and a concentration of 0.2 gram per 100 milliliters of chloroform.

The monomers polymerized and their structures are as follows:

| 30 | Ethylene phenylphosphonate | (phenyl)-P(=O)(O-CH₂-CH₂-O) cyclic |
| 31 | 1,2-propylene phenylphosphonate | (phenyl)-P(=O)(O-CH(CH₃)-CH₂-O) cyclic |
| 32 | 2,3-butylene phenylphosphonate | (phenyl)-P(=O)(O-CH(CH₃)-CH(CH₃)-O) cyclic |
| 33 | Trimethylene phenylphosphonate | (phenyl)-P(=O)(O-CH₂-CH₂-CH₂-O) cyclic |
| 34 | Trimethylene methylphosphonate | CH₃-P(=O)(O-CH₂-CH₂-CH₂-O) cyclic |

The monomer, catalyst concentration, reaction temperature, reaction period, yield, reduced viscosity and description of the polymer is recited for each example in Table II below:

a period of three minutes. A simultaneous increase in the viscosity of the reaction mixture was also observed. The temperature of the reaction mixture was maintained in the range of from 100° C. to 110° C. for an addi-

TABLE II

| Example No. | Monomer | Catalyst Concentration in millimoles per mole of monomer | Reaction Temperature in ° C. | Reaction Time in hours | Polymer Yield in percent | Reduced viscosity | Description of Polymer |
|---|---|---|---|---|---|---|---|
| 30 | Ethylene phenyl phosphonate | 6.3 | 90 | 18 | 76 | 0.42 | Slightly tacky, elastomeric material. |
| 31 | 1,2-propylene phenylphosphonate | 6.6 | 190 | 4.5 | 86 | (¹) | Viscous, ether insoluble oil. |
| 32 | 2,3-butylene phenylphosphonate | 11.9–13.9 | 100 | 24 | (¹) | (¹) | Do. |
| 33 | Trimethylene phenylphosphonate | 4.6 | 90 | 24 | 72.5 | 0.50 | Slightly tacky, elastomeric material. |
| 34 | Trimethylene methylphosphonate | 11.1 | 115 | 22 | 36.5 | (¹) | Slightly tacky elastomer which crosslinks upon drying. |

¹ Not determined.

*Example 35.—Copolymerization of ethylene phenylphosphonate with the cyclic phenylphosphonate of neopentylglycol using di-n-butylzinc as catalyst*

To a 500 milliliter reaction vessel fitted with a mechanical stirrer were charged 9.2 grams (0.05 mole) of ethylene phenylphosphonate and 11.3 grams (0.05 mole) of the cyclic phenylphosphonate of neopentylglycol. The vessel was purged with nitrogen gas and a nitrogen atmosphere was thereafter maintained in the vessel. Stirring was initiated and the vessel was heated until the phosphonate mixture therein had attained a temperature of 115° C. A solution consisting of 0.13 gram of di-n-butylzinc in 0.75 milliliter of toluene was then added to the ethylene phenylphosphonate-cyclic phenylphosphonate of neopentyl glycol mixture. The addition of the di-n-butylzinc catalyst resulted in an exothermic reaction which caused the temperature of the reaction mixture to rise 5° C. in one minute. This exothermic reaction was accompanied by thickening of the reaction mixture and the cessation of stirring. The temperature of the reaction mixture was maintained at a temperature in the range of from 110° C. to 120° C. for a period of nineteen hours to insure maximum conversion to copolymer.

The copolymer was purified by dissolution in dioxane and precipitation in ethyl acetate. A 9.6 gram yield of ethylene phenylphosphonate-cyclic phenylphosphonate of neopentyl glycol copolymer was obtained which exhibited a reduced viscosity in chloroform of 0.40 measured at a temperatrue of 25° C. and a concentration of 0.2 gram of copolymer per 100 milliliters of chloroform.

That copolymer is formed is evidenced by the fact that under these conditions the cyclic phenylphosphonate of neopentyl glycol does not homopolymerize and the yield of polymer is greater than the amount of ethylene phenylphosphonate monomer used. In addition, phosphorus analysis as shown below indicates the polymer to contain 4.5 molecules of cyclic phenylphosphonate of neopentyl glycol per molecule of ethylene phenylphosphonate.

*Phosphorus analysis.*—Found: 13.9 percent. Calculated for poly(phenylphosphonate of neopentyl glycol): 13.3 percent; for poly(ethylene phenylphosphonate): 16.8 percent.

*Example 36.—Copolymerization of the cyclic phenylphenylphosphonate of neopentyl glycol with ε-caprolactone*

A mixture of 11.3 grams (0.05 mole) of the cyclic phenylphosphonate of neopentyl glycol and 5.7 grams (0.05 mole) of ε-caprolactone was copolymerized by the method described in Example 39, above. A solution of 0.13 gram of di-n-butylzinc in 0.75 milliliter of toluene was utilized as catalyst. Addition of said catalyst was followed by an immediate exothermic reaction causing the temperature of the reaction mixture to rise 7° C. in a period of three minutes. A simultaneous increase in the viscosity of the reaction mixture was also observed. The temperature of the reaction mixture was maintained in the range of from 100° C. to 110° C. for an additional period of forty-three hours to insure maximum conversion to copolymer.

Purification of the copolymer was made by dissolution of the copolymer in chloroform followed by precipitation in diethylether. The purified cyclic phenylphosphonate of neopentyl glycol–ε-caprolactone copolymer exhibted a reduced viscosity in chloroform of 1.02 measured at a temperature of 25° C. and a concentration of 0.2 gram per milliliter. That the polymer contains no lactone or phosphonate homopolymer is evidenced by its solubility in 95% ethanol and the failure of water to precipitate polymer from the ethanol solution.

*Example 37.—Copolymerization of the cyclic phenylphosphonate of neopentyl glycol with the cyclic carbonate of neopentyl glycol*

A mixture of 11.3 grams (0.05 mole) of the cyclic phenylphosphonate of neopentyl glycol and 6.5 grams (0.05 mole) of the cyclic carbonate of neopentyl glycol was copolymerized in the same manner as described in Example 39. Addition of di-n-butylzinc catalyst in toluene as described in Example 39 caused an exothermic reaction of 11° C. in two minutes and was accompanied by thickening of the reaction mixture.

The copolymer was purified by dissolution in chloroform and precipitation in a 50 percent by weight ethanol in water solution. A yield of 3.0 grams of cyclic phenylphosphonate of neopentyl glycol-cyclic carbonate of neopentylglycol copolymer was obtained. The purified copolymer exhibited a reduced viscosity of 0.48 in chloroform at a temperature of 25° C. and a concentration of 0.2 gram of copolymer per 100 milliliters of chloroform.

The copolymer which is elastomeric in nature exhibited a tensile strength of 270 pounds per square inch and an ultimate elongation of 860 percent with considerable permanent set.

Phosphorus analysis of the copolymer shows it to contain 3.4 percent phosphorus. This corresponds to 5.3 carbonate units per phosphonate unit.

*Example 38.—Copolymerization of the cyclic phenylphosphonate of neopentyl glycol with the cyclic carbonate of neopentyl glycol*

A mixture of 0.95 gram (0.004 mole) of the cyclic phenylphosphonate of neopentyl glycol and 10.2 grams (0.08 mole) of the cyclic carbonate of neopentyl glycol was copolymerized in the same manner as described in Example 39. Addition of the di-n-butylzinc catalyst caused an exothermic reaction of 25° C. in two minutes and was accompanied by thickening of the reaction mixture.

The polymer was purified by dissolution in benzene and precipitation in ethanol. A yield of 9.6 grams of cyclic phenylphosphonate of neopentylglycol-cyclic carbonate of neopentyl glycol copolymer was obtained.

This copolymer had a reduced viscosity in chloroform of 1.58 measured at a temperature of 25° C., and a concentration of 0.2 gram of copolymer per hundred milliliters of chloroform.

The monomers, reaction temperature, copolymer yield, copolymer composition, reduced viscosity and mechanical properties of the copolymers where determined are recited in Table III below:

TABLE III

| Ex. No. | Monomer A | Mole percent Monomer A | Monomer B | Reaction Temperature in °C. | Approximate Reaction Period in hours | Copolymer Yield in percent | Mole percent of Monomer A in Copolymer | Reduced Viscosity | Mechanical Properties | | |
|---|---|---|---|---|---|---|---|---|---|---|---|
| | | | | | | | | | Secant modulus in lbs. per sq. inch | Tensile Strength in lbs. per sq. inch | Elongation in percent |
| 39 | Ethylene phenyl-phosphonate. | 50 | Cyclic carbonate of neopentyl glycol. | 100–120 | 20 | 58 | 49.5 | 0.18 | | | |
| 40 | ---do--- | 5.0 | ---do--- | 106–133 | 20 | 79 | 4.1 | 1.25 | 184,000 | 2,800 | 3.5–8.0 |
| 41 | ---do--- | 50 | Cyclic phenyl-phosphonate of neopentyl glycol. | 114–123 | 21 | 48 | 17 | 0.40 | | | |
| 42 | ---do--- | 93 | Ethylene vinyl phosphonate. | 90–105 | 22 | 81 | | (¹) | | | |
| 43 | ---do--- | 95 | ---do--- | 95–118 | 19 | | | (¹) | | | |
| 44 | ---do--- | 50 | Phenyl glycidyl ether. | 91–100 | 20 | 48 | 87 | 0.10 | | | |
| 45 | Cyclic phenyl-phosphonate of neopentyl glycol. | 50 | Cyclic carbonate of neopentyl glycol. | 88–94 | 17 | 17 | 16 | 0.48 | | 270 | 860 |
| 46 | ---do--- | 5.1 | ---do--- | 108–133 | 17 | 86 | 3.7 | 1.58 | 220,000 | 3,050 | 5.8–11.6 |
| 47 | ---do--- | 50 | Phenyl glycidyl ether. | 105–107 | 17 | 18 | 18.5 | 0.1 | | | |
| 48 | ---do--- | 50 | ---do--- | 100–110 | 23 | 24 | 2.8 | 6.88 | 67,000 | 2,800 | 18–276 |
| 49 | ---do--- | 50 | ε-Caprolactone | 113–120 | 21 | | | 1.02 | | | |
| 50 | Cyclic phenyl-phosphonate of 2.3-butanediol. | 50 | Cyclic Carbonate of neopentyl glycol. | 108–118 | 22 | 31.4 | 25.3 | 0.37 | | | |

The mechanical properties of the copolymer, which are given below, are similar to those of the carbonate homopolymer.

In an attempt to determine the effect of orientation on films made from the cyclic phosphonate copolymers, oriented and non-oriented copolymer films were tested. The results appear below in Table IV.

TABLE IV

| Monomer A | Present Monomer A | Monomer B | Orientation percent | Crystalline Melting point in °C. | Tensile Strength in pounds per square inch | Elongation | | Secant Modulus in pounds per square inch |
|---|---|---|---|---|---|---|---|---|
| | | | | | | At Yield | At Break | |
| None | | Cyclic Carbonate of Neopentyl glycol. | 0 | 115–120 | 3,500 | | 10 | 190,000 |
| Ethylene phenyl-phosphonate | 4.1 | ---do--- | 0 | 70–85 | 2,775 | 1.9 | 7.9 | 185,000 |
| Do | 4.1 | ---do--- | 350–400 | 70–85 | 9,000 | | 12.9 | 226,000 |
| Phenylphosphonate of neopentyl glycol. | 3.7 | ---do--- | 0 | 85–90 | 3,050 | 1.8 | 11.6 | 220,000 |
| Do | 3.7 | ---do--- | 500–550 | 85–90 | 27,500 | | 27 | 510,000 |
| Do | 16.0 | ---do--- | 0 | <25 | 270 | | 860 | |

Tensile strength _____lbs. per sq. inch__ 3,050
1% secant modulus _____do____ 220,000
Ultimate elongation _____percent__ 11.6

However, the copolymer has the advantage over the carbonate homopolymer in that heating films of the copolymer to 90° C. followed by rapid quenching to room temperature allowed them to be oriented 500 to 550 percent. This orientation greatly enhanced the mechanical properties as shown below by the data obtained for a sample of the copolymer film which had been oriented 500 to 550 percent:

Tensile strength _____lbs. per sq. inch__ 27,500
1% secant modulus _____do____ 510,000
Ultimate elongation _____percent__ 27

*Examples 39–50.—Copolymerizations of cyclic phosphonates*

Utilizing the method described in Example 39 various cyclic phosphonate copolymers were prepared utilizing about 3.0 millimoles of di-n-butylzinc per mole of monomer as the catalyst.

The copolymers were purified by the same method as described in Example 39, and the reduced viscosity in chloroform was determined at a temperature of 25° C. and a concentration of 0.2 gram per 100 milliliters of chloroform.

What is claimed is:
1. A method of preparing an organic phosphonate polymer containing the repeating unit

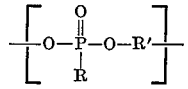

wherein R is a non-reactive monovalent hydrocarbon radical of from 1 to 18 carbon atoms inclusive and R' is an alkylene radical containing from 2 to about 18 carbon atoms inclusive in which the two valency carbon atoms are separated by no more than one carbon atom, with the proviso that when the said organic phosphonate polymer is a homopolymer, it exhibits a reduced viscosity greater than 0.35 as measured at 25° C. in chloroform at a concentration of about 0.2 gram of polymer per 100 cubic centimeters of chloroform, which includes polymerizing the cyclic phosphonates of the formula

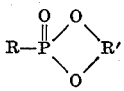

wherein R is a non-reactive monovalent hydrocarbon radical of from 1 to 18 carbon atoms and R' is a divalent aliphatic hydrocarbon radical containing from 2 to 18 carbon atoms in which the two valency carbon atoms are separated by no more than 1 carbon atom which comprises heating said phosphonate monomers to a temperature of from 10° C. to 180° C. inclusive in the presence of a catalytic amount of a catalyst selected from the group consisting of lower dialkyl zinc, lower dialkyl cadmium and poly(isobutylaluminum oxide).

2. The method of claim 1 wherein said catalyst is lower dialkyl zinc.

3. The method of claim 1 wherein said catalyst is lower dialkyl cadmium.

4. The method of claim 1 wherein said catalyst is poly(isobutylaluminum oxide).

References Cited by the Examiner

UNITED STATES PATENTS

| 2,382,622 | 8/1945 | Toy | 260—937 |
| 2,893,961 | 7/1959 | McManimie | 260—461.304 |
| 3,043,821 | 7/1962 | Coover et al. | 260—80 |
| 3,062,788 | 11/1962 | McConnell et al. | 260—2 |

FOREIGN PATENTS 1,196,971  6/1959  France.

OTHER REFERENCES

Gefter: "Organophosphorous Monomers and Polymers," pp. 147, 193, and 204–217 (1962).

LEON J. BERCOVITZ, *Primary Examiner.*

DONALD E. CZAJA, *Examiner.*

J. J. KLOCKO, *Assistant Examiner.*